UNITED STATES PATENT OFFICE.

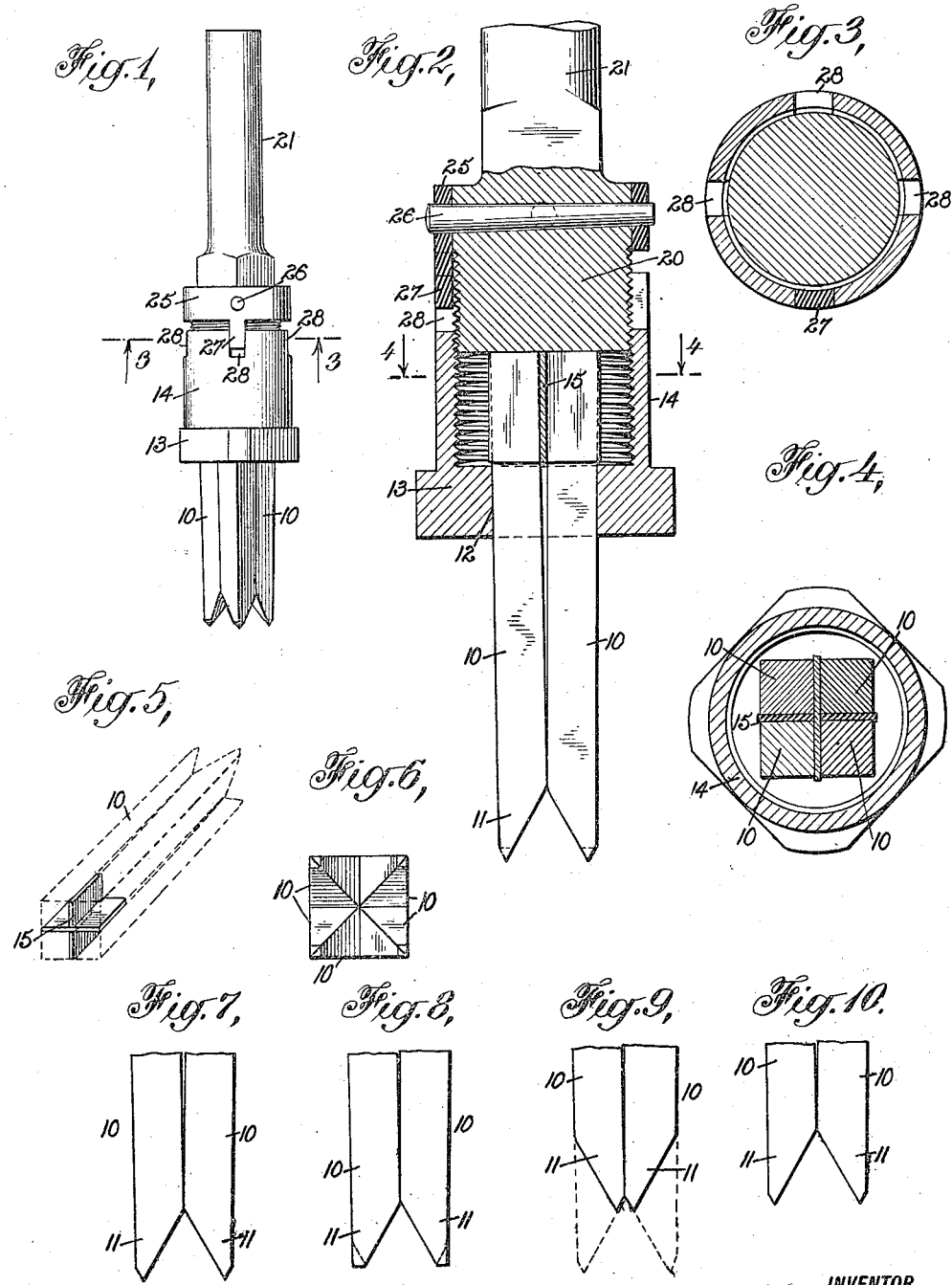

ADAM BOCK, OF BROOKLYN, NEW YORK.

CUTTING-TOOL.

1,252,082. Specification of Letters Patent. Patented Jan. 1, 1918.

Application filed February 6, 1917. Serial No. 146,877.

*To all whom it may concern:*

Be it known that I, ADAM BOCK, a subject of the German Emperor, and a resident of the city of New York, (borough of Brooklyn), in the county of Kings and State of New York, have invented a new and Improved Cutting-Tool, of which the following is a full, clear, and exact description.

The invention relates to cutting tools such as are used in pneumatic hammers or held in the hand by a stone mason or sculptor while operating on marble, granite or other stone.

The object of the invention is to provide a new and improved cutting tool arranged to dispense with all blacksmith work for reshaping and resharpening purposes and to allow effective use of the cutting tool until worn down to a short stem.

In order to accomplish the desired result, use is made of four assembled chisels, each approximately square in cross section and each having a pyramidal end forming a cutting point, the inner sides of the four chisels adjacent the said pyramidal ends being in contact with each other. The assembled chisels form a cutting tool which is square in cross section, the chisels being adapted to be sharpened while in assembled position by abrading the outer sides of the pyramidal ends to allow use of the assembled chisels as a cutting tool for a certain period of time and the chisels being adapted to be turned half-way around to be re-assembled to form a cutting tool for use in cutting during another period of time.

A practical embodiment of the invention is represented in the accompanying drawings forming a part of this specification in which similar characters of reference indicate corresponding parts in all the views.

Figure 1 is a side elevation of the cutting tool;

Fig. 2 is an enlarged sectional side elevation of the same;

Fig. 3 is an enlarged inverted sectional plan view of the same on the line 3—3 of Fig. 1;

Fig. 4 is a sectional plan view of the same on the line 4—4 of Fig. 2;

Fig. 5 is a perspective view of the liner for holding the butt ends of the chisels spaced apart, the chisels being shown in dotted lines;

Fig. 6 is a face view of the cutting end of the assembled chisels;

Fig. 7 is a side elevation of the assembled and sharpened chisels ready for work;

Fig. 8 is a similar view of the same after the points are dulled;

Fig. 9 is a similar view of the same after the chisels are worn down to extreme position; and Fig. 10 is a similar view of the same with the chisels reversed or turned about ready for use.

Cutting tools such as now generally used by stone masons and sculptors are provided with a head, from one end of which project four integral pyramidal points. In using such a cutting tool for trimming blocks of granite, marble and other materials, the points become dull and require reshaping and resharpening by a blacksmith. During the reshaping of the tool, the latter has to be heated, forged and tempered and when this process is several times repeated, the points are liable to become brittle and break off, thus rendering the entire tool useless. With the improvement presently to be described in detail, the work of the blacksmith is entirely dispensed with and the tool can be resharpened by grinding or abrading and its component parts can be periodically assembled to allow use of the cutting tool until it is practically used up. As shown in the drawings, four chisels 10 of special tool steel are used, each made square in cross section and provided at one end with a pyramidal point 11. The chisels 10 are assembled to form a square in cross section and the chisels fit into a socket 12 formed in a holder 13. The butt ends of the chisels 10 project into the tubular portion 14 of the holder 13 and the outer ends project beyond the end of the holder, as plainly indicated in Figs. 1 and 2. The inner sides of the chisels 10 adjacent the points 11 are in contact with each other while the butt ends are held spaced apart by a cross-shaped liner 15, preferably made of two pieces of sheet metal provided with slots at the middle to allow of assembling the two plates in cross shape, as will be readily understood by reference to Fig. 5.

In order to firmly wedge the chisels 10 in position in the socket 12, the sides of the latter are made tapering and a follower 20 is used and secured into the tubular portion 14 of the holder 13, with the inner end of the follower 20 abutting against the faces of the butt ends of the chisels 10, as will be readily understood by reference to Fig. 2. The follower 20 forms an integral portion of the stock 21, adapted to be set into the tool holder of a pneumatic hammer, or adapted to be held in the hand of the mason or sculptor making use of the cutting tool at the time. In order to lock the follower 20 in position on the tubular portion 14 of the holder 13, use is made of a sleeve 25 removably fitting on to the outer end of the follower 20 and adapted to be secured thereto by a conical pin 26, driven diametrically through the sleeve 25 and the follower 20. One side of the sleeve 25 is provided with a depending lug 27 extending into one of a series of recesses 28 formed on the tubular member 14 of the holder 13 and spaced equidistances apart, as plainly shown in Fig. 3. After the chisels 10 have been placed in position in the socket 12 and the liner 15 has been placed between the butt ends of the chisels, then the follower 20 is secured into the tubular portion 14 of the holder 13 to securely wedge the chisels 10 in the socket 12. The sleeve 25 is now placed in position on the outer end of the follower 20 and then the lug 27 is engaged with one of the recesses 28 and the pin 26 is driven home to fasten the sleeve in position, thus locking the follower 20 from unscrewing relative to the holder 13.

The chisels 10 when first assembled and fastened in the holder 13, as above described, have the inner faces of the cutting ends or points 11 in the form of long bevels, while the outer faces have short bevels, as will be readily understood by reference to Figs. 1, 2, 6 and 7. The chisels 10 while in assembled position and held in the holder 13 are sharpened after the points have become dull by grinding or abrading the outer faces on a suitable rotary grinding or abrading wheel, it being understood that the outer faces of two adjacent points or ends 11 are ground simultaneously. The chisels 10 can be sharpened a number of times in the manner described and while being held in the holder 13, and by reference to Figs. 7, 8, and 9, it will be seen that the repeated abrading of the outer faces of the cutting ends of the chisels make the bevels thereof longer, while the bevels on the inner faces become shorter and the points appear nearer the center of the assembled chisels. When the assembled chisels have been repeatedly sharpened and appear as shown in Fig. 9, then the chisels 10 are removed from the holder 13 and each is given a half turn and then the chisels in this reassembled position are replaced in the holder 13 and wedged in the socket 12 thereof, as previously explained. It will be noticed that when the chisels 10 are reversed as described, then the long outer bevels at the cutting ends, as shown in Fig. 9, become the inner bevels and the short inner bevels, shown in Fig. 9, become the outer bevels, that is, the assembled chisels have their cutting ends again in the position as shown in Fig. 7, only the chisels are somewhat shorter. The cutting tool is now again used the same as above described and is sharpened from time to time, and when the chisels again reach the condition shown in Fig. 9, they are removed from the holder and reversed as above described to permit use of the chisels for another period of time. From the foregoing, it will be seen that by the arrangement described all blacksmithing work is completely dispensed with and when the points become dull, it is only necessary to grind the outer faces thereof. When the chisels, after repeated sharpening, reach the condition shown in Fig. 9, they are reversed as described and re-used during another period of time. It will be seen that the chisels can be used until the cutting points are close to the holder 13.

Having thus described my invention, I claim as new and desire to secure by Letters Patent:

1. A cutting tool comprising a tool holder having a square socket, a plurality of assembled chisels fitting the said socket, a cross shaped spacer having its members extending between the butt ends of the chisels to hold the butt ends spaced apart, and a stock screwing into the said holder and against the end faces of the butts of the chisel.

2. A cutting tool comprising a tool holder having a square socket, a plurality of assembled chisels fitting the said socket, a cross shaped spacer having its members extending between the butt ends of the chisels to hold the butt ends spaced apart, a stock screwing into the said holder and against the end faces of the butts of the chisel, and a locking device locking the said stock in place on the tool holder.

3. A cutting tool, comprising a holder having a square tapering socket, four reversible chisels approximately square in cross section and each having at its outer end a pyramidal point, said chisels having their butt ends extending into the holder and their cutting ends projecting from the holder and in contact with each other, means for spacing the butt ends of the chisels, and adjustable means for engaging the butt ends of the chisels.

4. A cutting tool comprising a tool holder having a square socket provided with tapering sides, a plurality of assembled chisels square in cross section and fitting the said socket, the butt ends of the chisels projecting into the holder and the pointed ends of the chisels projecting beyond the said holder, a cross shaped spacer fitting between the butt ends of the chisels, a stock screwing in the said holder against the end faces of the butt ends of the said chisels, and a locking sleeve removably held on the said stock and having a lug, the said holder having a recess into which projects the said lug to lock the stock and holder together.

5. A cutting tool comprising four assembled chisels each being approximately square in cross section and each having a pyramidal end forming a cutting point, the inner sides of the four chisels, adjacent the pyramidal ends being in contact with each other, the assembled chisels forming a cutting tool square in cross section, the chisels being adapted to be sharpened in assembled position by abrading the outer sides of the pyramidal ends to allow use of the assembled chisels as a cutting tool for a period of time and the chisels being adapted to be turned half way around and to be assembled to form a cutting tool for use in cutting and resharpening during another period of time.

ADAM BOCK.

Copies of this patent may be obtained for five cents each, by addressing the "Commissioner of Patents, Washington, D. C."